Feb. 3, 1970  V. M. DENISOV ET AL  3,492,915
GEAR-PRODUCING MACHINE

Filed Feb. 28, 1967  2 Sheets-Sheet 1

INVENTORS
Vladimir M. Denisov
Jury V. Lubkov

BY
Holman, Glascock, Downing & Seebold
ATTORNEYS

INVENTORS
Vladimir M. Denisov
Jury V. Lubkov

BY Holman, Glascock, Downing & Seebold
ATTORNEYS

# United States Patent Office 3,492,915
Patented Feb. 3, 1970

3,492,915
GEAR PRODUCING MACHINE
Vladimir Mikhailovich Denisov, Ul. Volzhskaya 34, kv. 26, and Jury Vladimirovich Lubkov, Ul. Ogorodnaya ZZS, 148, kv. 5, both of Saratov, U.S.S.R.
Filed Feb. 28, 1967, Ser. No. 619,285
Int. Cl. B23f 9/10
U.S. Cl. 90—5                      5 Claims

ABSTRACT OF THE DISCLOSURE

In a gear producing machine, a support for the rotatable cutting tool, the shaft of said cutting tool being mounted in an eccentric drum which may also be mounted for adjustable rotation in a second eccentric drum. As many eccentric drums as desired may be used in order to give the desired adjustment of the shaft of the cutting tool from the center of a cylinder in which the eccentric drums are mounted. The cylinder in which the eccentric drums are mounted is rotatable in a rotatable casing in a manner so that the axis of the cylinder is adjustable to be at a selected angle to the axis of the casing, and the shaft of the cutting tool lies at an angle to the axis of the eccentric drum in which it is mounted. Power means is provided to rotate the housing and to rotate the gear blank being cut and separate motor means is provided to drive the cutting tool.

---

The present invention relates to gear-cutting machines used primarily for cutting bevel and hypoid gears having curved teeth, and in which the tool holding the spindle is tiltable with respect to the axis of symmetry of the cradle in which it is mounted.

Gear-cutting machines known in the prior art and used mainly for cutting bevel and hypoid gears, have a cradle bearing a spindle mounted in a sleeve and holding the tool. The cradle casing houses drums arranged one inside another which are used for setting and tilting the spindle to certain angular positions. In machines of such type, the spindle is tilted by one of the drums. The tilting of the tool spindle is used both for obtaining the cone angle of the generating wheel and for adjusting the back angle of the tool, which results in rather complicated calculations necessary for setting the drums.

Further, if in the course of the cutting of a test gear, it turns out that the back angle of the tool must be changed to improve the contact spot of the pair of gears being machined, the complicated calculations will have to be repeated in order to determine the necessary corrections to be made in setting the drums, as well as the required changes introduced in the setting of all of the drums.

The foregoing limits the technological potentialities of machines of the known type and makes it impossible to use highly productive methods of cutting bevel and hypoid gears having curved teeth, such as a semi-generating method, for example, when the gear of a larger diameter is cut without generating.

Another disadvantage of machines of the known type is that the tool holding spindle has a very long and complicated gearing with the main drive of the machine. A great number of gear trains in the drive rotating the spindle result in the complexity of the design of the gear-cutting machine cradle and especially for the assembling of separate units of the machine.

Also, non-orthogonal bevel gearings used in the drive of the spindle (with the angle between the axis not equal to 90°) make it difficult to set up the angular positions of the drums of the cradle.

These disadvantages increase the vibrations and noise level of the machine during operation, and thus result in a lower surface finish quality of the machined teeth, as well as in a lower precision of the elements of the machined pair of gears.

An object of the present invention is to provide a gear-cutting machine used primarily for cutting bevel and hypoid gears having curved teeth, which makes it possible to set and trim each element of the cradle independently.

Another object of the present invention is to simplify the calculations necessary for setting the machine.

Still another object of the present invention is to provide a machine of the same type having a short gear train between the electric motor and the tool spindle.

Yet another object of the present invention is to provide a machine of the same type with a possibility of assembling the machine cradle unit independently of other units thereof.

A further object of the present invention is to provide a gear-cutting machine which makes it possible to obviate difficult operation of setting the elements of the machine cradle.

A still further object of the present invention is to reduce vibration and noise of the machine when operating, and to improve the finishing of the machined surface of the teeth and the precision of the elements of the machined pair of gears.

Still another important object of the present invention is to provide a gear-cutting machine more simple in design and manufacture than those of the known type, featuring greater technological potentialities and conveniences in operation.

In accordance with the above and other objects, the present gear-cutting machine used primarily for cutting bevel and hypoid gears comprises a cradle bearing a tool spindle mounted in a sleeve, and housing drums arranged one inside another and adapted for setting and tilting the spindle. The said drums are housed in a rotary element mounted in the cradle casing, with the casing being tiltable together with the drums with respect to its axis of symmetry irrespective of the rake of the spindle and the latter is provided with an individual drive housed in the cradle casing.

It is expedient to make the rotary element as a hollow cylinder having a tapered face end engaging with a corresponding recess provided in the cradle casing.

It is also possible to use a rotary element made as a semi-cylinder engaging with the inner cylindrical surface of the cradle casing, with the axis of the semi-cylinder being perpendicular to that of the casing and the semi-cylinder being provided with a cylindrical boring having its axis perpendicular to the axis of the semi-cylinder.

It is also possible to use a rotary element made as a drum having a spherical outer surface engaging with a corresponding recess provided in the cradle casing.

A favorable solution can be attained by making the individual drive of the tool spindle as an electric motor, preferably adjustable as to the speed of rotation, and reducer geared therewith, whose casing is preferably fixed on the sleeve of the tool spindle, and the driven member being rigidly connected to the tool spindle.

It is expedient to use a worm gearing as a reducer of the individual drive of the tool spindle, with the worm wheel thereof being rigidly fixed on the tool spindle, and the drive being kinematically connected to the electric motor by means of a pair of cylindrical gears.

It is also possible to use, in the individual drive of the tool spindle, a cylindrical reduction gearing with internal gearing proper, with the gear with internal toothing being ripidly fixed on the tool spindle and kinematically connected to the electric motor by a pair of cylindrical gears.

Thus, the present machine provides easy setting and high precision of machining of pairs of gears, is simple in design and construction, convenient and reliable in operation.

Given below is a description of an exemplary embodiment of the invention with reference to the accompanying drawings, in which.

Figure 1:
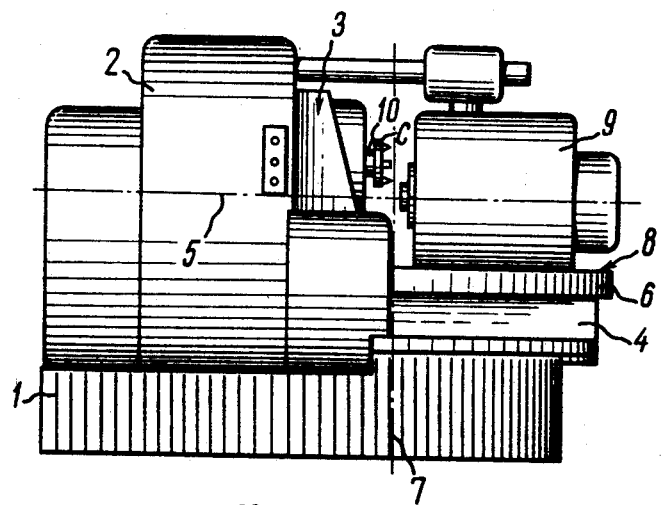
FIG. 1 is a view in front elevation of the machine for cutting bevel and hypoid gears having curved teeth.

A gear-cutting machine for cutting bevel and hypoid gears comprises a frame 1 (FIG. 1) with a stand 2 rigidly fixed thereon and bearing a cradle 3.

The frame 1 has longitudinal guides (not shown in FIG. 1) on which a table 4 is located which is movable along the guides in the direction parallel to axis 5 (FIGS. 4, 5, 6, 7) of the cradle 3.

The surface of the table 4 has longitudinal guides (not shown in FIG. 1) with a base plate 6 mounted thereon. The base plate 6 is rotatable around a vertical axis 7 extending through the center of the machine (the center of the machine being determined as the point coinciding with apex O of the cone (FIGS. 2 and 3) of the bevel gear being machined).

On its top portion the base plate 6 has horizontal guides 8 (FIG. 1) along which a head stock 9 for the bevel gear being machined moves.

The cradle 3 has a tool spindle 10 (FIGS. 1–7), provided with a cutter head C (or a grinding disk, in case the machine is intended for tooth grinding) mounted in a sleeve 11 (FIGS. 4–7). The sleeve 11 is mounted in a drum 12 in which it is movable together with the tool spindle 10 in the direction of its axis 10′.

The spindle 10 is tilted by a turn of the drum 12 mounted in a bore in drum 13, around the axis 14 of the bore, the bore in the drum 13 being at an angle to the axis of drum 12.

The angular position of the spindle 10 is maintained by the drum 13 which turns together with the spindle 10, sleeve 11 and drum 12 in the cylindrical boring of a drum 15. The radial setting of the tool spindle 10 with respect to the axis 5 of the cradle 3 may be accomplished by the drum 15 mounted in a drum 16 by means of turning in the cylindrical boring of the latter.

The setting of the spindle 10 into the position for machining the tooth of a bevel gear 19 may be effected by rotating the drum 16 mounted in a rotary element made as a hollow cylinder 17 (FIGS. 4 and 5) which has a skewed face end A (or as a semi-cylinder 18 associating with the inner cylindrical surface of the cradle casing, having the axis perpendicular to the axis of the casing, and a cylindrical boring with the axis perpendicular to the axis of the semi-cylinder), together with the tool spindle 10, sleeve 11, drums 12, 13 and 15 in the cylindrical boring of the hollow cylinder 17 (FIGS. 4 and 5) or/and of the cylinder 18 (in case the rotary element is made as a semi-cylinder).

The hollow cylinder 17 mounted in a cradle casing 20 forming a tiltable element is rotatable about an axis 21 with respect to the axis 5 of the cradle axis 21 intersecting axis 5 at a point $O_1$ on the axis 5 of the cradle. The plane of the face end A of the hollow cylinder 17 is normal to axis 21 so rotating cylinder 17, together with the spindle 10, sleeve 11, drums 12, 13, 15 and 16 by means of turning it in the plane of surface A in the cradle casing 20, around the axis 21, adjusts the angularity of the assembly 16, 15, 13, 10 with respect to axis 5.

The hollow cylinder 17 mounted in the cradle casing 20 forming a tiltable element may be turned with respect to the axis 5 about point $O_2$ coinciding with the apex of a cone of the machined bevel wheel 19, together with the spindle 10, sleeve 11, drums 12, 13, 15 and 16 by means of turning it in the recess, an inclined boring, in the casing 20.

The recess in the casing 20 should be made with the axis about which in this case the hollow cylinder 17 will turn, passing through said point $O_2$ in the direction perpendicular to the plane of the face end A.

The casing 20 of the cradle 3, mounted in the stand 2 (FIG. 1), can adjust the angular position of the hollow cylinder 17 together with the spindle 10, sleeve 11, drums 12, 13 and 15 by means of turning in roller guides 23 of the stand 2.

With the rotary element constituted by a semi-cylinder tiltable element 18 (FIG. 6) mounted in the cradle casing 24, it is tilted together with the spindle 10, sleeve 11, drums 12, 13, 15 and 16 with respect to the axis 5 of the cradle, about point $O_3$ lying on the axis 5 of the cradle and coinciding with the apex of the cone of the bevel gear 19 being machined by turning the semi-cylinder in the cylindrical boring 25 provided in the casing 24. In this case, the casing 24 mounted in the stand 2 can adjust the angular position of the semi-cylinder 18 together with the spindle 10, sleeve 11, drums 12, 13, 15 and 16 by turning in the roller guides 23 of the stand 2.

The rotary element may also be made as a tiltable element 26 (FIG. 7) having a spherical outer surface, and mounted in a cradle casing 27 provided with a recess, a spherical boring, corresponding to the spherical surface of the element 26.

The setting of the tool spindle 10 to the position for machining the tooth of the bevel gear 19 may be effected by turning the drum 26 in the spherical boring together with the spindle 10, sleeve 11 and drums 12, 13 and 15. The tilting of the drum 26 together with the spindle 10, sleeve 11 and drums 12, 13 and 15 with respect to the axis 5 of the cradle about point $O_4$ lying on the axis 5 of the cradle and coinciding with the apex of the cone of the bevel gear being machined, may be performed by its turning in the spherical boring in the casing 27 of the cradle. By turning in the roller guides 23 of the stand 2 the casing 27 may adjust the angular position of the drum 26 together with the sleeve 11 and drums 12, 13 and 15.

Figures 2, 3:
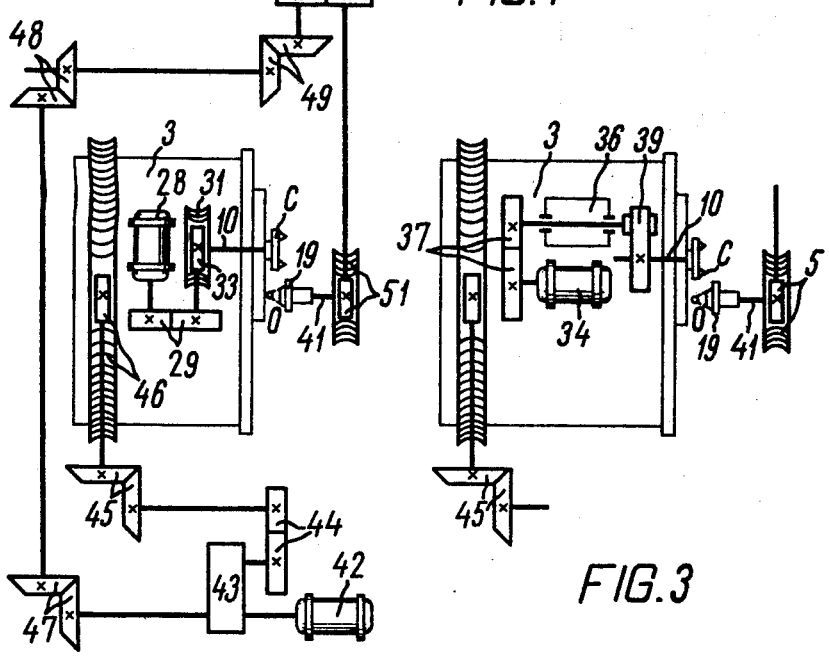
FIG. 2 is a diagrammatic view of the gearing of the machine and the individual drive of the tool spindle worm gearing.
FIG. 3 is a diagrammatic view of elements of the gearing of the machine in which the individual drive of the tool spindle has a cylindrical reduction gearing.
Figure 4:
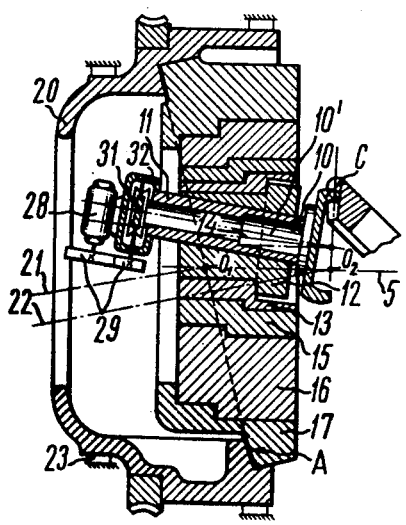
FIG. 4 is a view partly in elevation and partly in cross-section of the cradle in which the rotary element is made as a hollow cylinder having a tapered or skewed end face, set for cutting bevel gears by the generating method.
Figure 6:
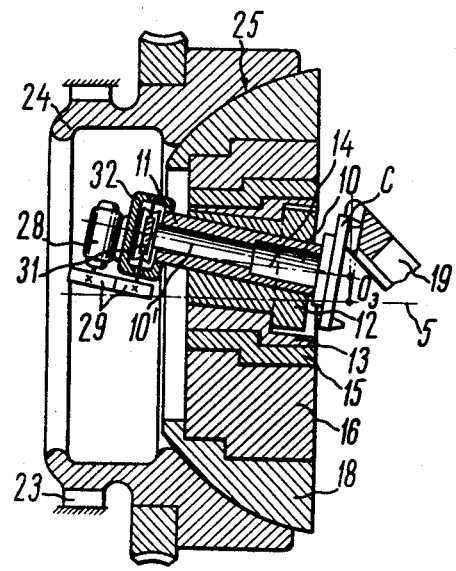
FIG. 6 is a view partly in elevation and partly in cross-section of the cradle in which the rotary element is made as a semi-cylinder engaging with the cylindrical surface of the cradle casing, having its axis perpendicular to the axis of said casing.
Figure 5:
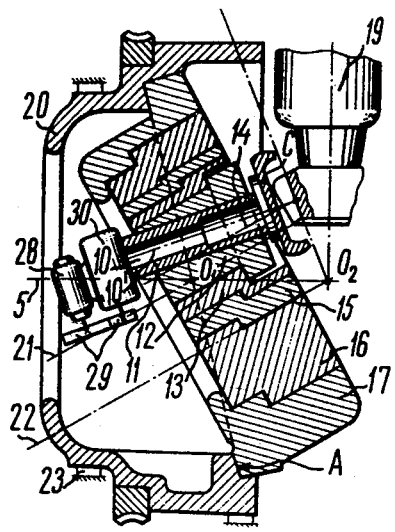
FIG. 5 is a view partly in elevation and partly in cross-section of the cradle in which the rotary element is a hollow cylinder having a tapered or skewed end face, set for cutting bevel gears by the semi-generating method.
Figure 7:
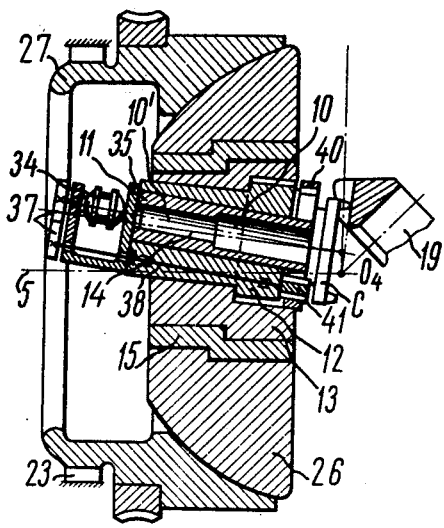
FIG. 7 shows a diagram of the cradle in which the rotary element is made as a drum with the spherical outer surface, set for cutting bevel wheels by the generating method.

The individual drive of the tool spindle 10 is an electric motor 28 (FIGS. 4, 5 and 6) adjustable as to its speed of rotation, and a worm reduction gearing 30 (FIG. 5) connected by a pair of cylindrical gears 29, in which a worm wheel 31 thereof (FIG. 4) is rigidly connected to the tool spindle 10. The electric motor 28 mounted on the casing 32 of the worm reduction gearing 30 (FIG. 5) is rigidly fixed on the sleeve 11 (FIGS. 4 and 6) and imparts rotation to the spindle 10 via the pair of cylindrical gears 29 and a worm gearing pair 31 and 33 (FIG. 2).

It is also possible to use the individual drive of the tool spindle 10 defined by an electric motor 34 (FIG. 7) mounted on a bracket 35, and a cylindrical reduction gearing 36 (FIG. 3) connected thereto by a pair of cylindrical gears 37. The bracket 35 is rigidly fixed on the drum 12, with the cylindrical reduction gearing 36 having a shaft 38 (FIG. 7) mounted in the drum 12, and a cylindrical pair 39 with internal teeth. A wheel 40 with internal teeth (FIG. 7) is rigidly fixed on the tool spindle 10. In this case the tool spindle 10 is rotated by the electric motor 34 (FIG. 3) via the pair of the cylindrical gears 37 and the cylindrical pair 39 having internal teeth.

In case the electric motor 28 (FIG. 2) and/or 34 (FIG. 3) having a constant speed of rotation is employed, the cylindrical pairs 29 (FIG. 2) and 36 (FIG. 3) must be interchangeable.

The rotation of the cradle 3 (FIG. 2) is co-ordinated with that of a spindle 41 for the bevel gear 19 by the electric motor 42 connected via a reversing device 43, cylindrical gearings 44, bevel pair 45 and worm gearing 46 to said cradle 3, and via the same reversing device 43, bevel pairs 47, 48 and 49, cylindrical gearings 50 and a worm gearing 51 to the spindle 41 for supporting the bevel gear 19.

The operation of the invention may be summarized as follows:

It will be noted in FIGURES 4–7 that the drum 12 is in the form of a hollow cylinder having a geometrical axis inclined to the axis 14 and also intersecting such axis with the cylinder accommodating the sleeve 11 which journals the tool spindle 10 is adjustably rotating the drum 12 about the axis 14 and bearing in mind that the drum is seated within the through bore of the drum 13, it will be appreciated that the rotated drum 12 will alter its location with respect to the geometric axis of the turnable element 17. This action effects an inclination of the tool spindle which gives the representation of profile and longitudinal configuration of the generating gear. In addition, the above inclination is effected regardless of the inclination of the turnable element respecting the geometrical axis of the body of the cradle.

The drum 13 is employed for orienting the executed inclination of the tool spindle 10 by rotating the drum as the unit together with the tool spindle, the sleeve 11, and drum 12 due to the fact that it is suitably seated within the through bore of the drum 15. The geometrical axis of the drum 15 coincides with the geometrical axis of the drum 13 and extends in parallelism to the geometrical axis of the turnable element.

The feed and idle running of the tool C and/or the bevel gear 19 may be effected by any methods known to those skilled in the art.

What we claim is:

1. In a gear producing machine for bevel and hypoid gears, a cradle having a body, a turnable element positioned within the body, drums adjustably rotatable one within another and within the turnable element, at least one of said drums being so constructed that adjustment rotation thereof alters the position of the geometrical axis of said at least one drum to the geometrical axis of the turnable element, a sleeve carrying a tool spindle capable of moving axially within the centermost of said drums executing the inclination and orientation of the tool spindle relative to the geometrical axis of the turnable element to denote a given profile and longitudinal shape of tooth of a generating gear, said turnable element being located within said body to be capable of inclination and orientation of produced inclination together with said drums to denote a pitch cone of a generating gear regardless of said inclination and said orientation of inclination of the tool spindle, and individual drive means for the tool spindle located within the cradle body.

2. The gear producing machine for bevel and hypoid gears as claimed in claim 1 in which said turnable element includes a hollow cylinder having a beveled end, and said cradle body having a corresponding recess with which said beveled end cooperates.

3. The gear producing machine for bevel and hypoid gears as claimed in claim 1 in which said turnable element includes a drum having an outer spherical portion, and said cradle body having a corresponding recess with which said outer spherical portion cooperates.

4. The gear producing machine for bevel and hypoid gears as claimed in claim 1 in which said turnable element includes a semi-cylinder, said cradle body having an internal cylindrical formation with which said semi-cylinder cooperates, the geometrical axis of the semi-cylinder being perpendicular to the geometrical axis of the cradle body, and the geometrical axis of a bore aperture within said semi-cylinder being perpendicular to the geometrical axis of the semi-cylinder.

5. The gear producing machine for bevel and hypoid gears as claimed in claim 1 in which said individual drive means includes a variable speed electric motor, a driven element secured to the tool spindle adjacent a tool, and a set of cylindrical gears provided with a reducer having internally meshing gears drivably connected to said electric motor and driven element.

References Cited

UNITED STATES PATENTS

| | | | |
|---|---|---|---|
| 3,044,365 | 7/1962 | Picanol | 90—5 |
| 3,137,206 | 6/1964 | Shinjo | 90—5 |
| 3,212,403 | 10/1965 | Deakin | 90—5 |

G. L. WEIDENFELD, Primary Examiner